United States Patent [19]

Loran

[11] 4,359,798
[45] * Nov. 23, 1982

[54] SYSTEM FOR CLEANING AND LUBRICATING SOUND RECORDING SURFACES

[76] Inventor: Thomas J. Loran, Boulder Canyon, Boulder, Colo. 80302

[*] Notice: The portion of the term of this patent subsequent to Aug. 23, 1998, has been disclaimed.

[21] Appl. No.: 820,232

[22] Filed: Jul. 29, 1977

[51] Int. Cl.³ .............................................. B08B 1/00
[52] U.S. Cl. .................................. 15/104.94; 15/227; 118/76; 118/109; 118/201; 118/269; 369/72
[58] Field of Search ............. 15/104.94, 104.93, 104.9; 369/72, 73, 74; 118/109, 76, 77, 264, 201, 203, 269

[56] References Cited

U.S. PATENT DOCUMENTS

| | | | |
|---|---|---|---|
| 2,656,420 | 10/1953 | Isberg | 118/109 X |
| 2,945,250 | 7/1960 | Worthington | 15/104.94 X |
| 3,280,420 | 10/1966 | Wanzenberg | 15/104.94 X |
| 3,490,946 | 1/1970 | Wolff | 928/900 X |
| 3,608,708 | 9/1971 | Storandt | 15/104.94 X |
| 3,637,497 | 1/1972 | Fitz Simmons | 252/54.6 X |
| 3,646,112 | 2/1972 | Sterling, Jr. | 252/54.6 X |
| 3,777,328 | 12/1973 | Kaplan | 15/104.94 |
| 3,806,260 | 4/1974 | Miller | 15/104.94 X |
| 4,213,870 | 7/1980 | Loran | 15/104.94 X |

FOREIGN PATENT DOCUMENTS 983724 2/1965 United Kingdom ............. 15/104.94

*Primary Examiner*—John D. Smith
*Assistant Examiner*—Bernard F. Plantz
*Attorney, Agent, or Firm*—John E. Reilly

[57] ABSTRACT

A cleaning and lubricating system is provided. The system includes an applicator comprised of a substrate carrying an excess of cleaning and lubricating compositions, and a buffing member, preferably in combination with the applicator.

In operation, the applicator is wiped against a to-be-cleaned and lubricated surface of an article. This action coats the article with an excess thickness of lubricating composition. The coating is then wiped with the buffing member and the excess lubricating composition is transferred to the buffing member so that the coating on the article is now of a controlled thickness. When an excess supply of lubricating composition builds up on the buffing member portion of the system, the buffing member may then be used as a cleaning and lubricating applicator.

7 Claims, 5 Drawing Figures

SYSTEM FOR CLEANING AND LUBRICATING SOUND RECORDING SURFACES

CROSS-REFERENCE TO RELATED APPLICATIONS

The following application is by the inventor of the present invention: U.S. patent application Ser. No. 820,351, entitled "Cleaning and Lubricating Compositions and Methods of Using the Same," Thomas J. Loran, inventor, filed concurrently with the present application, now U.S. Pat. No. 4,213,870.

BACKGROUND OF THE INVENTION

1. Field of the Invention

The present invention relates to a system for cleaning an article and applying a controlled thickness of lubricating composition to the article. More specifically it relates to a cleaning system in which a material coating applicator is combined with a buffing member to control the thickness of the coating.

2. Description of the Prior Art

As set forth, in more detail, in the above referred to U.S. patent application Ser. No. 820,351 filed July 29, 1977, now U.S. Pat. No. 4,213,870, many objects, and especially information carrying media, require coating with a lubricant in order to avoid their destruction by their very use.

In the use of phonograph records, because of the extreme sensitivity of modern playback equipment, the slightest imperfection, wear, or dirt on the record can become a great aesthetic irritant to the user. Additionally, unless the record is protected in some way, its very use will cause it to be worn and will eventually destroy its utility. Similar problems exist with regard to the use of magnetic media and projectable photographic film. In the use of each of these media, substantial friction can be generated by the relative motion of the media with respect to its transducer or within its system. By their nature, each of these media is difficult to protect from destructive wear. These media are generally relatively soft by comparison with the drive and transducer systems with which they are utilized. Therefore, in order to be utilized effectively, while avoiding destruction, they must be provided with a low coefficient of friction with respect to the environment through which they pass. Preferably, they will also be provided with a dry protective wear coating, which coating is a lubricant or has a low coefficient of friction. In this manner, the coating provides a sacrificial surface which can be worn by the system while leaving the actual media intact. Furthermore, where a sacrificial lubrication coating is provided for media, it must be of such a controlled thickness, up to about 15 to about 20 microinches (0.12 to 0.50 micron), that the coating will not reduce or distort the playback of the mechanical or magnetic recording. Additionally, where the coating is utilized for photographic film, it must be transparent, colorless, and uniformly smooth.

In the prior art, both phonograph records and photographic films have been coated with dry wear protecting or lubricating coatings. This has been accomplished by the application of the desired composition in the form of a liquid coating which was allowed to dry. Magnetic media has been protected by both the inclusion of the desired lubricating or wear protection materials in the media composition, or by the coating of desired compositions on the surface of the magnetic media in the form of a liquid which was allowed to dry. In some instances the coating solution has been impregnated into the media by means of pressure, as in U.S. Pat. No. 3,398,011. Instances of coating magnetic media with a dry lubricant by running it in contact with a dry solid lubricant, such as polytetrafluoroethylene are taught, for example, by U.S. Pat. No. 3,319,012. However, systems for coating lubricant compositions on the surfaces of media to a controlled thickness by the use of a dry applicator, comprised of a substrate carrying an excess of cleaning and lubricating composition, followed by buffing with a buffing member are not known to have been previously taught.

SUMMARY OF THE INVENTION

The present invention consists of a system for cleaning an article and applying a lubricating coating of controlled thickness to the article. It especially relates to the use of such a system when the article is an information containing media such as phonograph records, magnetic recording media, and photographic films. The system consists of an applicator to carry a coating composition, and a buffing member preferably in combination with the applicator. The applicator includes a substrate which carries an excess of cleaning and lubricating composition.

In operation, the supply applicator, containing excess cleaning and lubricating composition, is applied to the to-be-cleaned and lubricated surface of an article. An excess thickness of cleaning and lubricating composition is initially applied to the surface of the article. The article is then buffed with the buffing member, which buffing member picks up the excess thickness of lubricating composition, leaving a coating having a controlled thickness of about 5 to about 20 microinches.

Accordingly, an object of the present invention is to provide a cleaning and coating system in the form of an applicator carrying a dry coating composition and a buffing member for removing excess coating from the surface of an object treated with the applicator.

Another object of the present invention is to provide a system for applying a low coefficient of friction dry lubricant coating of controlled thickness on phonograph records, magnetic recording media, and photographic film.

A further object of the present invention is to provide a system for applying a thin controlled thickness coating to substrates having data stored thereon, which substrates are subject to relative mechanical motion when used.

The foregoing and other objects, features and advantages of the invention will be apparent from the following, more particular description of preferred embodiments of the invention.

BRIEF DESCRIPTION OF THE FIGURES

The foregoing and other objects, features, and advantages of the invention will be apparent from the following, more particular description of the preferred embodiments of the invention as illustrated in the accompanying drawings wherein.

DETAILED DESCRIPTION OF THE INVENTION

Figure 1:
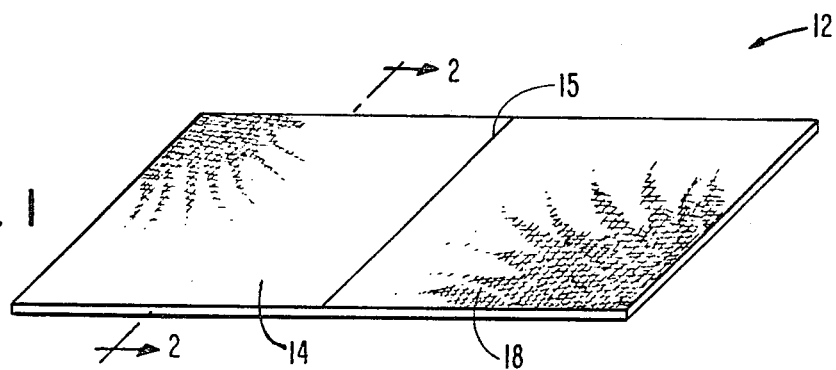
FIG. 1 is a perspective view of one form of the cleaning and lubrication system of the present invention.

According to the present invention, a system is provided which is capable of coating a controlled thickness, in the range of up to about 20 to about 30 microinches, of dry lubricant on the surface of an article. The system is characterized by a coating applicator and a buffing member, in combination. The coating applicator includes an excess of cleaning and lubricating coating material. In use, the applicator, containing the excess cleaning and lubricating composition, is applied to a to-be-cleaned and lubricated surface and coats that surface with an undesirably or unnecessarily thick coating of lubricating composition. Then, when the buffing member is wiped against the same surface it picks up the excess thickness of coating composition and leaves a coating thickness in the range of up to about 20 to about 30 microinches. When an excess of lubricating composition has been picked up by the buffing member, then the buffing member can itself be utilized as an applicator.

It is most surprising that controlled lubricant coating thicknesses, in the range of up to about 5 to about 20 microinches, can be obtained in this manner. However, it is theorized that the lubricating compositions form molecular bonds with the surface of the treated article, which along with Van der Waals forces provide a strong stable coating of from about 1 to 20 molecular layers thick. Then, depending on the size of the molecules and their orientation to the surface, this manifests itself as a coating of from about 5 up to about 30 microinches thick. Therefore, once the lubricating material is coated on a substrate to a thickness in excess of about 30 microinches, wiping the coating with a buffing member will remove the amount in excess of about 30 microinches and leave a controlled, and in the case where the treated article is media, a desirable thickness of lubricant coating.

The choice of applicator substrate material utilized in the practice of the present invention can vary widely, as a matter of choice. Preferably the applicator is soft and flexible and will not generate dirt or lint. Materials such as cloth, foam, leather and chamois are especially well suited for this purpose. In one preferred embodiment the substrate material is velvet. Velvet is especially suitable for this purpose as it provides a large amount of surface area to carry the lubricant composition. It also provides a large, supple surface area for distributing the lubricant which can readily reach recesses and crevices of the to-be-coated surface. For example, where the to-be-coated treated surface is a phonograph record, the fibers of the velvet reach into the small recesses or grooves of the record. When a velvet substrate is utilized as the substrate of the applicator, it may be of natural materials, such as cotton, or of synthetic fibers woven or treated to resemble velvet, or a combination of these materials.

Many lubricant coating compositions may be utilized to coat the substrate and provide a desirable applicator. All that is required is that the lubricant coating composition, or its binder, be relatively soft under ambient conditions, generally thermoplastic in nature, and capable of being transferred from the applicator to the to-be-treated surface when rubbed against the surface with nominal pressure. It is also desirable that the coating composition be dry, that is in a non-liquid state, after it has been coated on the applicator and before it is wiped on the to-be-treated article. Materials capable of use in this fashion include most hydrocarbons having more than about 13 carbon atoms, natural and synthetic waxes and paraffins, olefins, mono-basic and di-basic fatty acids and fatty acid esters, branched fatty acids, and various fluorocarbon compounds, such as perfluoroalkyl polyethers and tetrafluoroethylene telomers. Other low vapor pressure fluorocarbons may also be utilized. Also suitable are graphite, molybdenum disulfide, mono-unsaturated alkyl ethers of glycolesters, sperm oils, silicones, products of esterification with aliphatic chains of polysubstituted siloxanes and other lubricants, as set forth for example, in U.S. Pat. No. 3,398,011. These lubricants can be used alone or in combination and with or without a binder. The lubricant coating compositions most preferred for use in the practice of the present invention are those compositions including fluorinated alkyl esters as set forth in detail in previously referred to U.S. patent application Ser. No. 820,351. Lubricant compositions including fluorinated alkyl esters and antistatic agents and tetrafluoroethylene telomers, either alone with the fluorinated alkyl esters or in combination with each other and the fluorinated alkyl esters provide excellent results in the practice of the present invention.

The lubricant compositions may be applied to the substrate to form an applicator in any number of ways. In the simplest embodiment, they may be dissolved in a suitable solvent, either alone or in combination with a binder, and coated on the substrate. Such coating may be by dipping, spraying, rolling, hot transfer, or by any other means which will coat the applicator substrate with an excess of lubricating material. Where the coating composition is applied to the substrate in a liquid state, it is allowed to dry before use.

In those composition systems in which chlorofluorocarbons are the only practical solvents, the present invention is beneficial to the extent that, while it does not entirely eliminate the use of the chlorofluorocarbon solvents, the concentrations of the materials applied to the substrate can be much greater than they would be if applied directly to the to-be-cleaned and lubricated article, thus resulting in the use of less chlorofluorocarbon materials for this particular use. Also, such chlorofluorocarbons can be utilized in enclosed environments and not allowed to pollute the atmosphere.

In preferred embodiments, even though an excess of lubricant is desired on the substrate, it is necessary and desirable to apply a predetermined amount of lubricant composition to a known amount of surface area. Failure to control the amount of lubricant coating of the substrate may cause so much coating composition to be coated on the to-be-treated article that it will overwhelm and clog the buffing member and thereby make it impossible to control the thickness of the lubricant coating applied to the article.

The buffing member may be of almost any material, although it is preferably of material similar to the substrate of the applicator. Preferred materials include foam, cloth, leather, chamois, or velvet.

In the system of the present invention, the applicator and buffing member are utilized in combination, and are preferably joined together.

Figure 2:
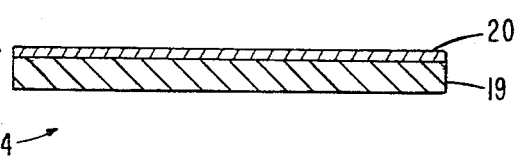
FIG. 2 is an exaggerated enlarged cross-sectional view taken along line 2—2 of the applicator portion of the system of FIG. 1.

Referring to FIG. 1, one form of the present invention is shown in which system 12 consists of applicator 14 connected in side by side relationship along seam 15, with buffing member 18, for example, by sewing. As shown in enlarged and exaggerated detail in FIG. 2, applicator 14 consists of substrate 19 and lubricant coating 20.

Figure 3:
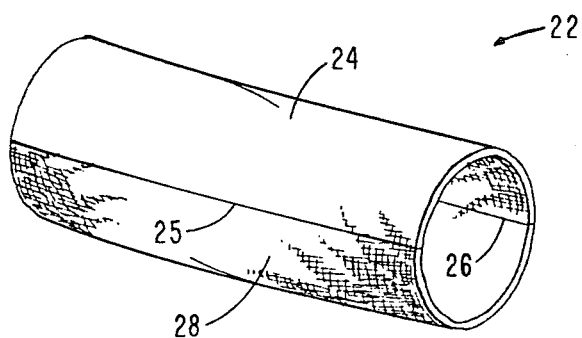
FIG. 3 is a perspective view of a modified form of the present invention wherein the applicator and buffing member form a tube.
Figure 4:
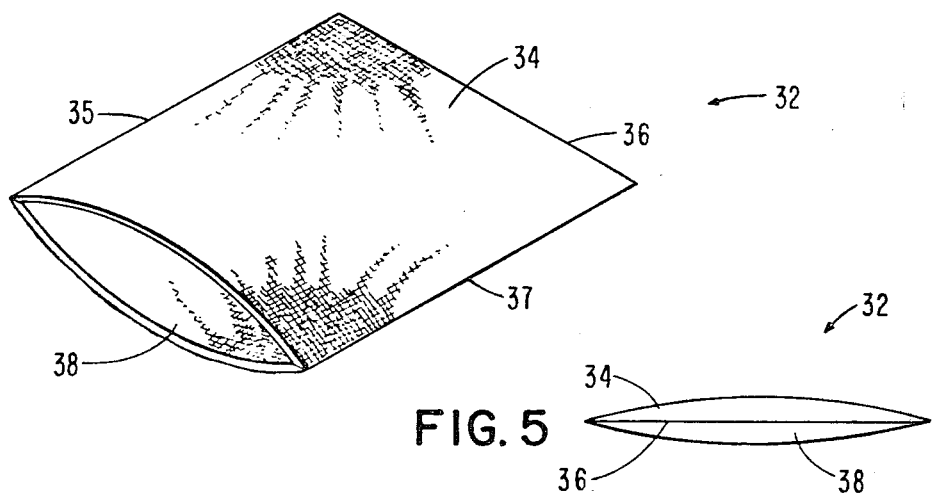
FIG. 4 is a perspective view of yet another modified form of the present invention wherein the applicator and buffing member form a mitt.
Figure 5:
FIG. 5 is an end view of the mitt FIG. 4.

Other connecting relationships lend themselves quite well to the practice of the present invention. For example, as shown in FIG. 3, system 22 consists of applicator 24 joined on two sides at seams 25 and 26 to buffing member 28 to form a tube. In another embodiment, as shown by FIGS. 4 and 5, system 32 includes applicator 34 joined on three sides at seams 35, 36, and 37 to buffing member 38 to form a mitt. The tube configuration of FIG. 3 and mitt configuration of FIG. 4 allow a user to insert his or her fingers firmly between the applicator and buffer and comortably apply first the applicator and then the buffing member to the surface of the to-be treated article.

Neither the size nor shape of the applicator nor buffer are critical. For convenience sake, where the applicator and buffing member are joined together to form a tube or mitt, they are both most conveniently in the form of rectangles or squares. Any means of joining the applicator and buffing member together, which does not interfere with their use, may be used. They may also be a single piece of material coated at one portion or on one side with lubricating composition. In preferred embodiments indicia may be used to distinguish the applicator from the buffing member. Any indicia may be used, but color coding is preferred. The applicator or buffing member may be attached to or carried by a back-up member, for example, for support and to equalize the pressure applied over the entire surface. Where the system is in the form of a tube or mitt for use on the fingers, a backing of foam has been found to be quite useful for this purpose.

In operation, the applicator is first wiped on an article, coating an excess thickness of lubricant composition on the article. Then, wiping the same surface with the buffing member removes the excess thickness of lubricant and leaves a thin coating of controlled thickness tightly bonded to the article. With repeated uses the applicator is slowly depleted of lubricant coating composition. However, as it is used the buffing member tends to accumulate amounts of coating composition and thus, the buffing member may eventually be suitable for use as an applicator. Beneficially, it has been found that the amount of material deposited by the applicator and then wiped off by the buffing member remains sufficiently controlled so that at no time is an excess thickness of material placed on the surface of the treated article. It has been determined experimentally that the amount of pressure used with either the applicator or the buffing member is not critical.

In some forms of use, it may be desirable to utilize an additional composition on the surface of the to-be-treated article, prior to wiping it with the applicator. For example, a fluid, such as alcohol, may be sprayed upon the to-be-treated surface just prior to its treatment with the applicator. The liquid is not intended to serve as a solvent for the coating on the applicator, but rather it is intended to loosen dirt and dust from the surface of the treated article, so that the surface is more efficiently cleaned when the applicator is wiped against it. Additionally, the composition applied to the surface may include additional useful materials such as, for example, lubricants, antistatic materials or wetting agents.

In operation, the system and method of the present invention are especially useful for cleaning and lubricating media such as phonograph records, magnetic recording media, and photographic film. In order for each of these media to function effectively, it is necessary that the thickness of the coating applied to their surfaces be carefully controlled so as not to distort or cause losses of the information carried by the media. The present system and method functions easily and effectively to coat such media with a controlled thickness of lubricant material so that the coating thickness is such that no distortion or loss of information from the media is noted.

EXAMPLE I

Utilizing trichlorotrifluoroethane as a solvent, about 93 grams of a composition containing 0.003% fluorinated alkyl ester, 0.13% polytetrafluoroethylene telomers and 0.04% antistatic ingredients was coated on a red velvet substrate measuring approximately 4.5×4.5 inches (11.5×11.5 cm). The solution was 99.83% solvent and only about 0.17% solids. After the solution was applied to the velvet it was allowed to dry, thus forming an applicator. The applicator was wiped across both sides of 29 phonograph records. Each record was then wiped with a gold velvet buffing member. Prior to wiping with the applicator and buffing member, each record had a coefficient of friction of about 0.37. After the records were wiped with the applicator and then wiped with the buffing member, they each exhibited a coefficient of friction of about 0.21.

In addition to the lowering of the coefficient of friction, the records exhibited no harmonic distortion after treatment and no detectable increase in noise. The records were also found to be free of dust and dirt, to be free of static charge, and to provide apparently improved audible sound, as compared with its sound prior to cleaning. Each record so treated had a uniform coating of lubricant about 10 microinches (0.24 micron) thick. Each treated record could be played at least 30 times without destroying the coating using average turntable, stylus and stylus loads. Microscopic examination of the records indicated that the grooves were not clogged with coating composition. The treatment reduced record wear.

EXAMPLE II

Phonograph records were treated with an applicator prepared as the applicator of Example I. The records were not wiped with the buffing member after the coating was applied. The coating was found to be uneven and as thick as 35 microinches in some places. When played the sound was distorted and the stylus tended to pick-up clumps of coating composition.

EXAMPLE III

Motion picture film was treated with an applicator prepared in the same manner as the applicator of Example I, and then buffed with the buffing member. The film showed a coefficient of friction of about 0.30 before it was treated and about 0.11 after it was wiped with the applicator and buffing member. A coating of about 25 microinches (0.60 micron) was coated on the film.

EXAMPLE IV

A lubricant composition was prepared containing 32.8 cc of trichlorotrifluoroethane, 25.26 cc of a 0.13% solution of polytetrafluoroethylene telomers in trichlorotrifluoroethane, 12.66 cc of amine antistatic agent in the form of a 0.13% solution in trichlorotrifluoroethane, and 0.1 cc of a 25% solution of fluorinated alkyl esters in trichlorotrifluoroethane. This composition was coated on a 4.5×4.5 inch substrate and allowed to dry, thus forming an applicator. When records were treated with the resulting applicator, and then buffed with a buffing member, results similar to those achieved in Example I were noted. After 29 records were treated, it was found that the buffing member could serve as an applicator for about 6 records.

When applicators are made using compositions of various lubricants, as set forth herein above, and coated on various substrates as previously enumerated, similar results were achieved, producing coatings of controlled thicknesses. This was true regardless of the type of media or other substrate to which the coatings were applied.

In the practice of the present invention there are large tolerances which can be accommodated, both as to the type and amount of coating composition carried by the applicator, the amount of pressure utilized to apply the coating to the to-be-treated article and the amount of pressure applied by the buffing member. Due to the constant nature of the Van der Waals and other forces which cause the materials to adhere to the treated article, this system and method of the present invention invariably produce coatings of controlled thicknesses which are suitable to function for the purposes of the present invention.

While several specific preferred embodiments of the present invention have been shown, it will be apparent to those skilled in the art that numerous changes and modifications may be made within the scope of the invention, and that such changes may be made without departing from the spirit and scope of the invention as defined by the following claims.

What is claimed is:

1. A mitt for applying and buffing a lubricating and cleaning composition to a sound recording surface comprising:
   said mitt being soft and flexible having mutually opposed applicator and buffing surface portions;
   said applicator and buffing surface portions being interconnected to form a pocket therebetween to facilitate insertion of and grasping with the hand;
   said applicator surface portion being impregnated with a lubricating and cleaning composition which comprises a mixture of fluorinated alkyl ester which is normally solid under ambient conditions in combination with a material selected from the group consisting of tetrafluoroethylene telomers and anti-static agents compatible with said fluorinated alkyl ester and a liquid carrier; and
   said buffing surface portion functioning to remove the excess lubricating and cleaning composition so as to form a controlled thickness coating on said recording surface.

2. A mitt as defined in claim 1 being composed of materials selected from the group consisting of cloth, foam, leather, chamois and velvet.

3. A mitt as defined in claim 1 wherein said lubricating and cleaning composition being in a thermoplastic state after it has been coated on said sound recording surface and applicator surface portion.

4. A mitt as defined in claim 1 wherein said applicator surface portion being impregnated with said composition by spraying.

5. A mitt as defined in claim 1 wherein said applicator and buffing surface portions being generally rectangular and interconnected along laterally opposed sides to form said mitt.

6. A mitt as defined in claim 1 wherein a minor proportion of the fluorinated alkyl ester is intermixed with a major proportion of an anti-static agent.

7. A mitt as defined in claim 6 wherein said sound recording surface to be lubricated being a phonograph recording surface.

* * * * *